(12) United States Patent
England (10) Patent No.: US 8,596,944 B2
(45) Date of Patent: Dec. 3, 2013

(54) COTTON MODULE FLIPPER METHOD AND APPARATUS

(76) Inventor: John M. England, Wynne, AR (US)

( * ) Notice: Subject to any disclaimer, the term of this patent is extended or adjusted under 35 U.S.C. 154(b) by 190 days.

(21) Appl. No.: 13/078,681

(22) Filed: Apr. 1, 2011

(65) Prior Publication Data

US 2011/0176897 A1    Jul. 21, 2011

Related U.S. Application Data

(60) Provisional application No. 61/407,101, filed on Oct. 27, 2010.

(51) Int. Cl.
*A01D 85/00* (2006.01)
*B65G 47/22* (2006.01)

(52) U.S. Cl.
USPC ............ 414/24.5; 414/770; 198/413

(58) Field of Classification Search
USPC ........ 414/24.5, 760, 770, 773, 774, 775, 776, 414/781, 111; 198/402, 403, 411, 412, 413, 198/379, 406, 410
See application file for complete search history.

(56) References Cited

U.S. PATENT DOCUMENTS

| | | | | |
|---|---|---|---|---|
| 1,366,933 A | * | 2/1921 | Pilley | 414/773 |
| 2,939,569 A | * | 6/1960 | Roach et al. | 177/145 |
| 3,286,854 A | * | 11/1966 | Crawford | 414/742 |
| 3,322,256 A | * | 5/1967 | Roach | 198/410 |
| 3,344,902 A | | 10/1967 | Crawford | |
| 3,361,279 A | * | 1/1968 | Brown et al. | 414/502 |
| 3,501,025 A | * | 3/1970 | Ranking et al. | 414/789.7 |
| 3,570,827 A | * | 3/1971 | Breedon | 432/245 |
| 3,612,309 A | | 10/1971 | Van Doorn et al. | |
| 3,923,176 A | | 12/1975 | Wynn et al. | |
| 4,022,314 A | * | 5/1977 | Cornell | 198/413 |
| 4,050,598 A | | 9/1977 | Schurz | |
| 4,103,794 A | | 8/1978 | Shaw | |
| 4,179,017 A | | 12/1979 | Tilley | |
| 4,376,607 A | * | 3/1983 | Gibson | 414/24.6 |
| 4,396,330 A | * | 8/1983 | Rozeboom | 414/24.5 |
| 4,573,863 A | * | 3/1986 | Picotte | 414/763 |
| 5,540,534 A | * | 7/1996 | Wolf et al. | 414/400 |
| 6,070,711 A | * | 6/2000 | Murano et al. | 198/779 |
| 6,811,367 B2 | | 11/2004 | Ellis | |
| 7,241,098 B1 | * | 7/2007 | Wilson | 414/111 |
| 7,703,596 B1 | * | 4/2010 | Grollitsch | 198/395 |
| 2002/0187021 A1 | * | 12/2002 | Drost | 414/111 |
| 2004/0005208 A1 | | 1/2004 | Ellis | |
| 2009/0202327 A1 | | 8/2009 | Cory et al. | |
| 2010/0024617 A1 | | 2/2010 | Stover | |
| 2010/0124481 A1 | * | 5/2010 | Winn | 414/806 |
| 2011/0194918 A1 | * | 8/2011 | Freeman | 414/412 |

OTHER PUBLICATIONS

Stover Equipment Co., Inc., Stover Unwrapper GIS, http://www.stoverequipment.com/unwrapper%20GIS.html, Jun. 10, 2011 has been assigned as the date of this document—see the Examiner Initiated Interview Summary.

* cited by examiner

*Primary Examiner* — Gregory Adams
*Assistant Examiner* — Lynn Schwenning
(74) *Attorney, Agent, or Firm* — Garvey, Smith, Nehrbass & North, L.L.C.; Seth M. Nehrbass; Charles C. Garvey, Jr.

(57) ABSTRACT

An apparatus to tilt, flip, or rotate a round cotton module on a conveying system employs actuated arms includes that support a bar which fits in place of a roller on a provided conveyor system having multiple rollers. A cotton module can be easily rotated or flipped to a vertical position when the bar rotates between initial reclined and final elevated positions. The wrapping can be removed once the cotton module reaches the final elevated position.

29 Claims, 9 Drawing Sheets

FIG. 13

COTTON MODULE FLIPPER METHOD AND APPARATUS

CROSS-REFERENCE TO RELATED APPLICATIONS

Priority of U.S. Provisional Patent Application Ser. No. 61/407,101, filed Oct. 27, 2010, incorporated herein by reference, is hereby claimed

STATEMENT REGARDING FEDERALLY SPONSORED RESEARCH OR DEVELOPMENT

Not applicable

REFERENCE TO A "MICROFICHE APPENDIX"

Not applicable

BACKGROUND OF THE INVENTION

1. Field of the Invention

The apparatus of the present invention relates to an apparatus for conveying cotton bales or cotton modules wherein a lever or flipper rotates each bale or module from a first prone position to a second, elevated upright position while traveling along a conveyor (of rollers, for example). More particularly, this invention relates to a device that is used to tilt or flip cotton modules on for example a roller equipped conveying system wherein each module travels in a first prone position along a first conveyor or section and then is flipped upright.

2. General Background of the Invention

There are prior art bale/module flipping devices that have been patented. Examples of possibly related patents directed to such devices are listed below and each patent is hereby incorporated herein by reference:

U.S. Pat. Nos. 2,939,569; 3,286,854; 3,322,256; 3,344,902; 3,612,309; 3,923,176; 4,050,598; 4,103,794; 4,179,017; 5,540,534; 6,811,367; and US Publication Nos. 2004/0005208; 2009/0202327; 2010/0024617. A competing cotton module handling product can be seen at: http://www.stoverequipment.com/unwrapper%20GIS.html.

BRIEF SUMMARY OF THE INVENTION

The present invention provides an apparatus that tilts or flips or rotates a round cotton module traveling on a conveying system. The bale is tilted, flipped or rotated by means of an actuated lever or arm. The apparatus includes two horizontal arms extending some distance down each side of a module feeder conveyor.

These two horizontal arms each have pivot points at one end and a beam connecting the two arms on the other end. The beam that connects the two arms extend across the module feeder conveyor and rests between two rollers on a roller bed type module feeder conveyor or between two of the chain sprockets on a chain bed type module feeder conveyor. The two horizontal arms rotate upwards in sequence by means of extensible rams or cylinders (e.g., hydraulic cylinders) in order to cause the connector beam to rotate a round cotton module from its side onto its end for the purpose of enabling easy removal of the plastic wrap that envelops all or part of the round module.

The plastic wrap can be partially cut, either manually or automatically, in order to allow the wrap to be removed at the bottom portion of the round cotton module. By only removing the bottom portion of the plastic wrap, the top portion of the plastic wrap (which has not been removed) will hold the round cotton module together until such time that the next round module in the sequence has been partially unwrapped.

Once the next round cotton module in the sequence has been partially unwrapped, the wrap is completely removed from the first round module, allowing the module to fall apart, providing an even flow of cotton down the conveyor and into the module feeder.

A lever arm or flipper arm takes the place of a roller, or can be placed in between two rollers.

The flipper arm or lever arm can be placed between two sprockets at adjacent ends of chain sections on chain bed conveyors.

The cotton module has wrap that can remain on the module to hold it together until the next module is flipped.

BRIEF DESCRIPTION OF THE DRAWINGS

For a further understanding of the nature, objects, and advantages of the present invention, reference should be had to the following detailed description, read in conjunction with the following drawings, wherein like reference numerals denote like elements and wherein.

DETAILED DESCRIPTION OF THE INVENTION

Figure 1:
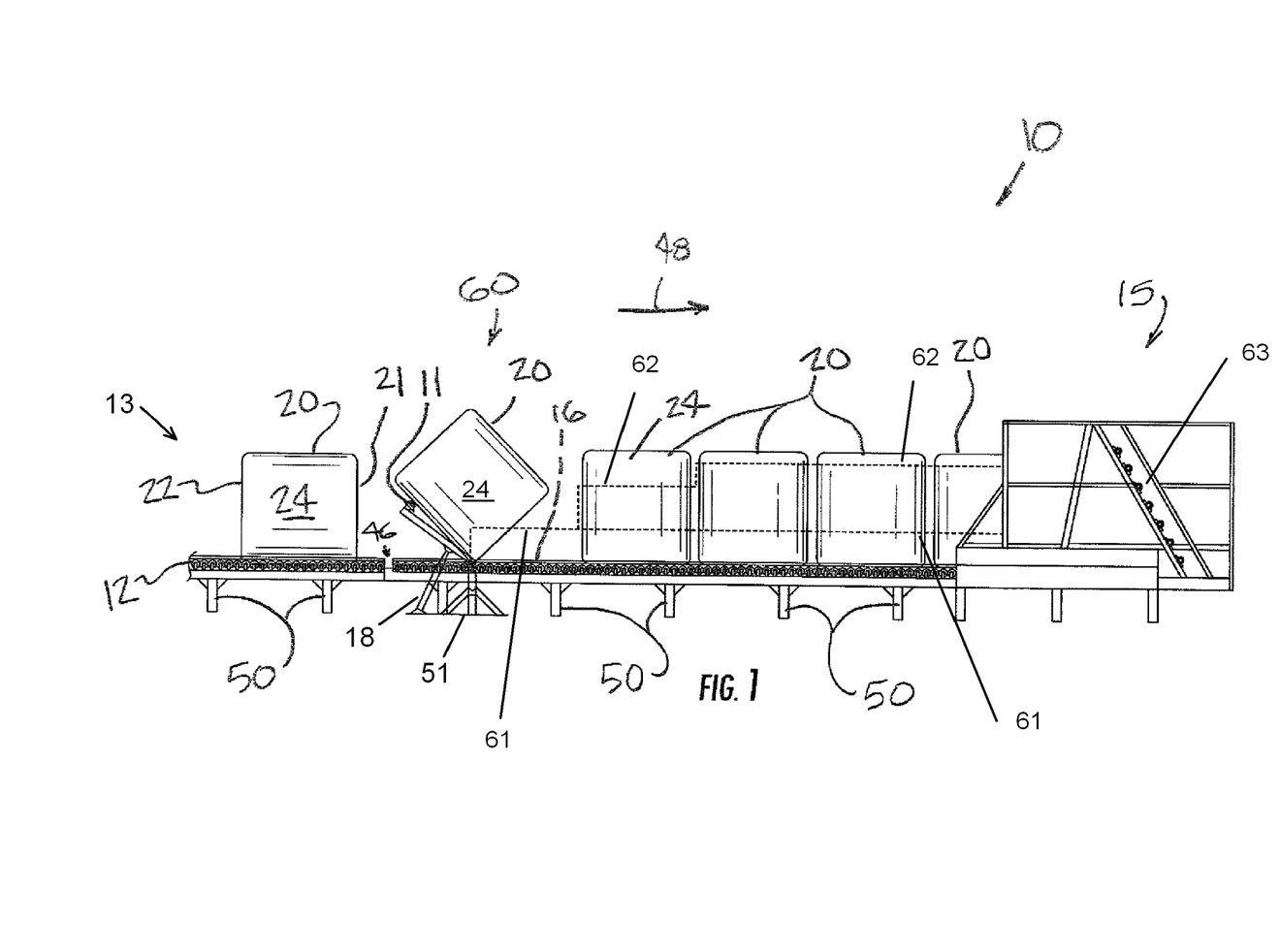
FIG. 1 is a side elevation view of a preferred embodiment of the apparatus of the present invention.
Figures 2, 3:
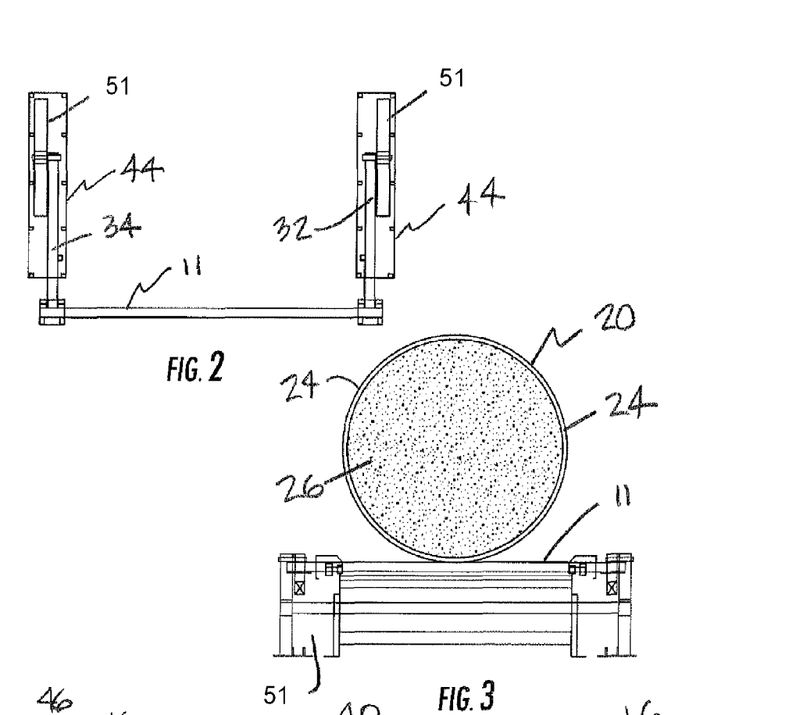
FIG. 2 is a fragmentary plan view of a preferred embodiment of the apparatus of the present invention.
FIG. 3 is a fragmentary end view of a preferred embodiment of the apparatus of the present invention.
Figure 5:
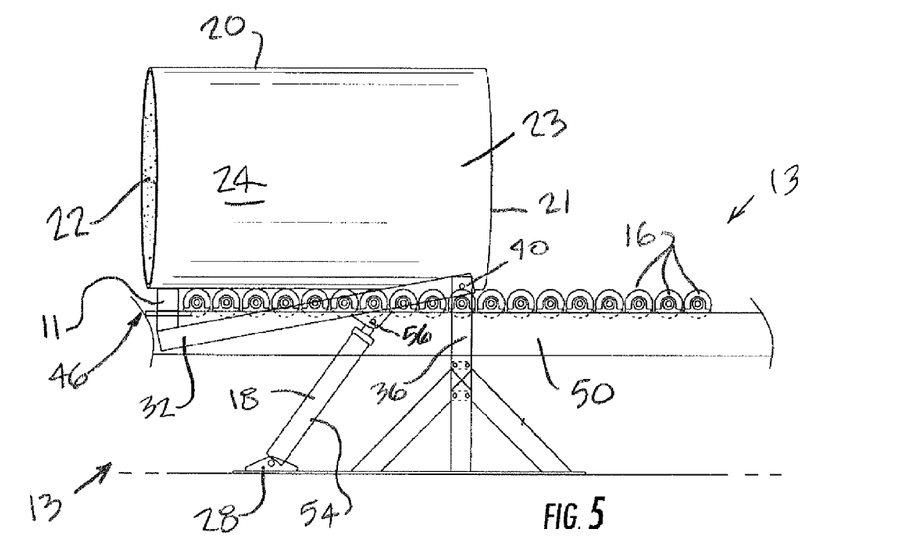
FIG. 5 is another side fragmentary elevation view of a preferred embodiment of the apparatus of the present invention.
Figure 6:
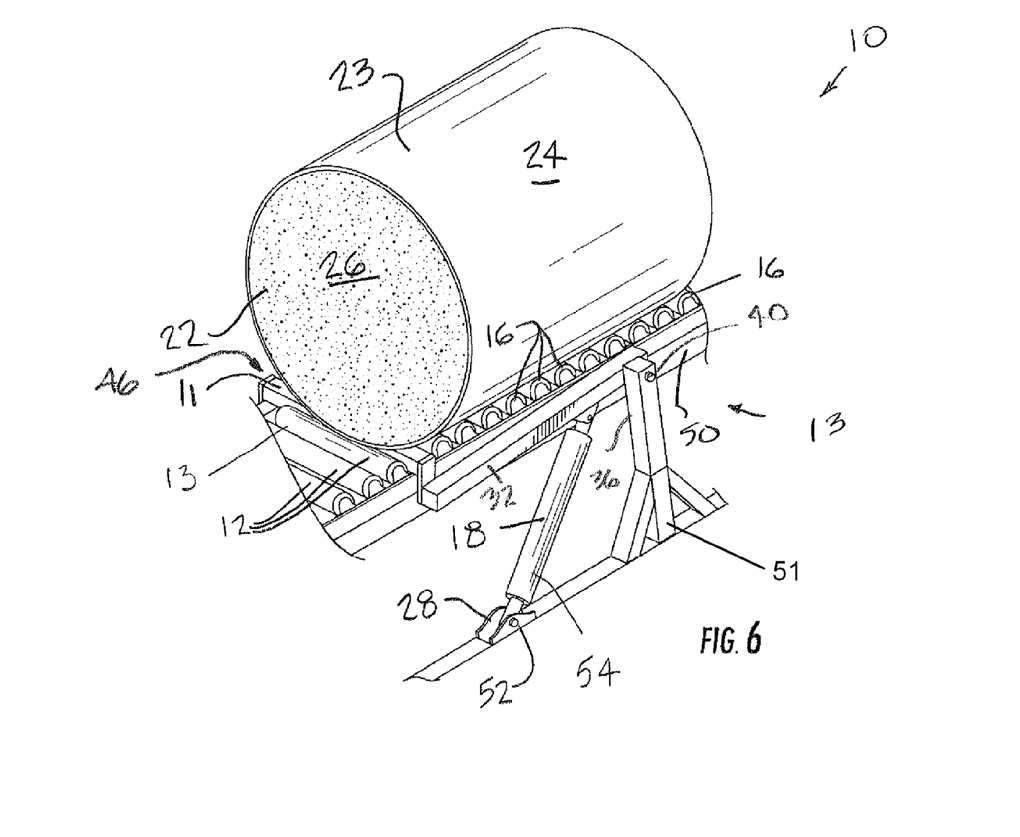
FIG. 6 is a partial perspective view of a preferred embodiment of the apparatus of the present invention.
Figure 7:
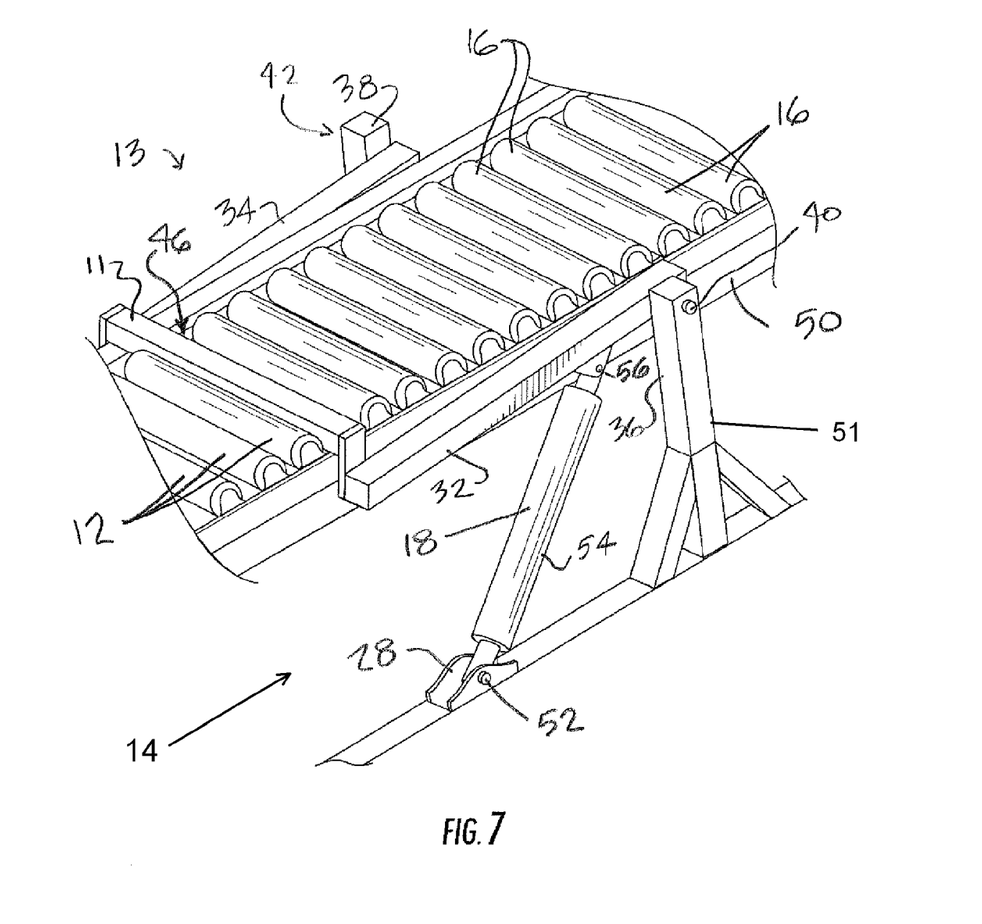
FIG. 7 is a partial perspective view of a preferred embodiment of the apparatus of the present invention.
Figure 8:
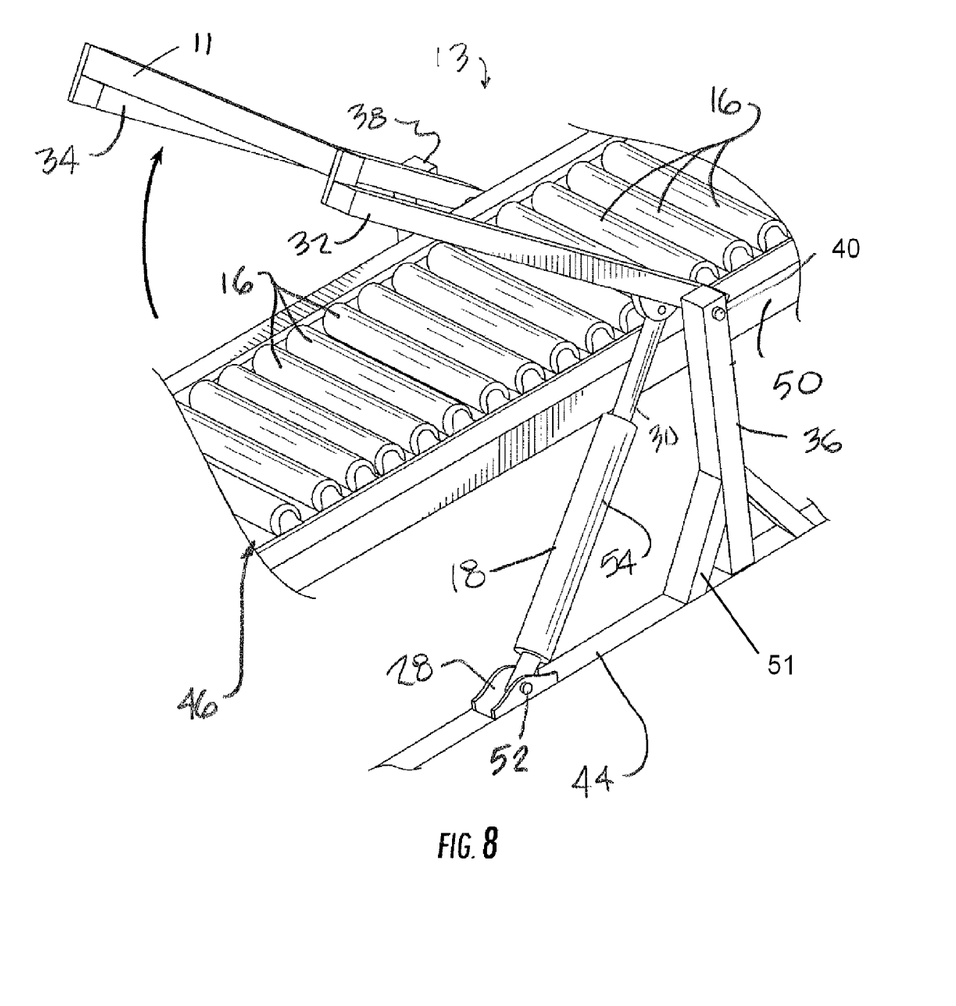
FIG. 8 is a partial perspective view of a preferred embodiment of the apparatus of the present invention illustrating rotation of the actuating arm.

The apparatus of the present invention is shown in FIGS. 1-14, designated generally by the numeral 10 in FIGS. 1 and 6. Cotton module flipping apparatus 10 provides an apparatus and method for rotating or flipping a cotton module 20 from a prone or generally horizontal position (see FIGS. 1, 3, 5-6) to an upright or vertical position (see FIGS. 1, 11-12). Cotton modules 20 are generally cylindrically shaped, having ends 21, 22 and side wall 23. Modules 20 are typically about 8' long and about 90" in diameter. Modules 20 are moved on a conveying system 13 that includes a frame 50 supporting rollers 12, 16.

Figure 4:
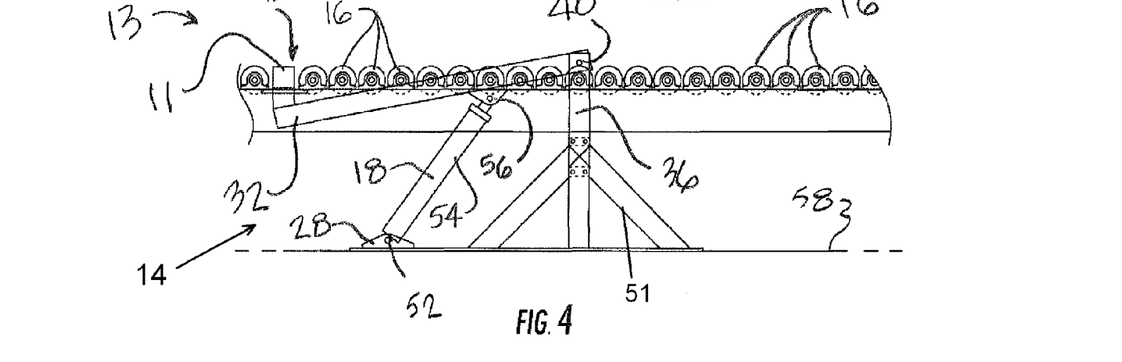
FIG. 4 is a fragmentary side elevation view of a preferred embodiment of the apparatus of the present invention.

The cotton module handling apparatus 10 can employ a lifting mechanism 14 in the form of a hydraulically operated flipper or lever device which has a bar 11 that fits in place of one of the rollers 12 or 16 in a conveyor system 13 (see FIG. 4). The two arms 32, 34 (one on each side of the conveyor) lift the bar 11 when the cotton module 20 is placed above the bar 11 (see FIGS. 5-6). Bar 11 can be powered by lift cylinder or cylinder 18. Cylinder 18 rotates arms 32, 34 to move each module 20 from a position on its side to a vertical position so that the plastic wrap 24 around module 20 can be removed before the cotton enters the cotton module feeder disperser head 15. These round cotton modules 20 are similar to round hay bales and can be created by a John Deere® 7760 cotton picker.

Bar 11 need not be square as shown, but could be round or some other shape and could for example be a roller.

In FIG. 1, there can be seen a plurality of cotton modules 20 being conveyed toward cotton module feeder disperser head 15. Each of the modules 20 is rolling upon rollers 12, 16 of a conveyer system or feeder-conveyor system 13. In FIGS. 1 and 4-11, a gap 46 is provided that is receptive of bar 11. Rollers 12 are the rollers before the gap 46. Rollers 16 are rollers that are after the gap 46 when considered in a direction of travel indicated by arrow 48 in FIG. 1.

Each cotton module 20 has an outer side wall 23 (see FIGS. 5 and 6) that can be generally cylindrically shaped. The outer side wall 23 is covered with a wrapper or wrapping 24 that is typically removed substantially immediately prior to the receipt of a cotton module into cotton module feeder disperser head 15. The module 20 thus includes the wrapper or wrapping 24 and the cotton 26 contained therein. As each cotton module 20 reaches gap 46, the module 20 is placed over bar 11. This initial position can be seen in FIGS. 3, 5, 6. Bar 11 is able to move from a reclined position wherein it rests in gap 46 as shown in FIGS. 5 and 6 to an elevated position as shown in FIGS. 9-12. A fully elevated position is shown in FIG. 12.

In order to move the cotton module 20 from the position of FIGS. 3-6 to the position of FIG. 12, an extensible cylinder 18 is provided. This extensible cylinder 18 can be a hydraulic cylinder, pneumatic cylinder, or other extensible cylinder. The cylinder 18 is mounted to an underlying support surface such as a concrete floor 58 with a foot 28. There can be a pivotal connection 52 between foot 28 and cylinder 18 as shown in FIG. 4. Extensible cylinder 18 includes a cylinder 54 and a push rod 30 that extends and retracts into or out of cylinder 54. A pair of arms 32, 34 are pivotally attached to frame 51 at pivots 40, 42 (see, e.g., FIG. 7). Frame 51 can provide a column or post 36, 38 for each arm 32, 34 as shown in FIG. 12.

Push rod 30 forms a pivotal attachment at 56 to arm 32. There can be an additional extensible cylinder 18 attached to the arm 34 in the same fashion as the arm 32 attachment to the extensible cylinder 18 shown in FIG. 12.

Arm 32 is pivotally attached to column or post 36 at pivot or pivotal attachment 40. Arm 34 is pivotally attached to column or post 38 at pivot or pivotal attachment 42. A base or anchor plate 44 can be provided and mounted to an underlying support surface such as a concrete floor or slab 58. Such an anchor plate or base 44 could be a steel or other structural material with foot 28 and column or post 36, 38 welded thereto.

In FIG. 1, there is a module 20 that is shown in transition, designated generally as the numeral 60. This transition position shows the module 20 as it is being moved from a reclined position to an upright or upstanding position.

Figure 9:
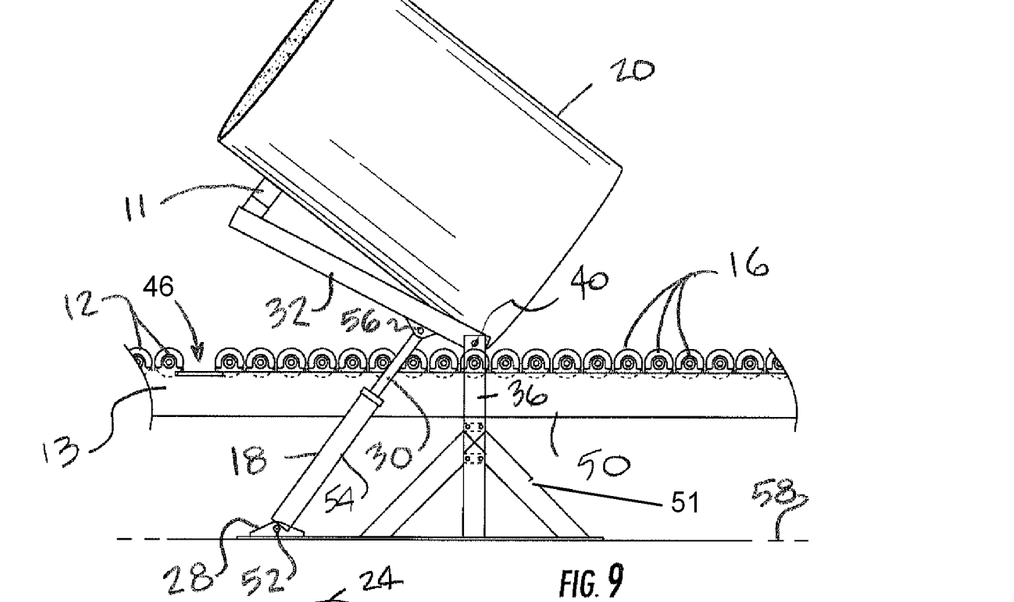
FIG. 9 is a side fragmentary view of a preferred embodiment of the apparatus of the present invention illustrating rotation of the actuating arm.
Figure 10:
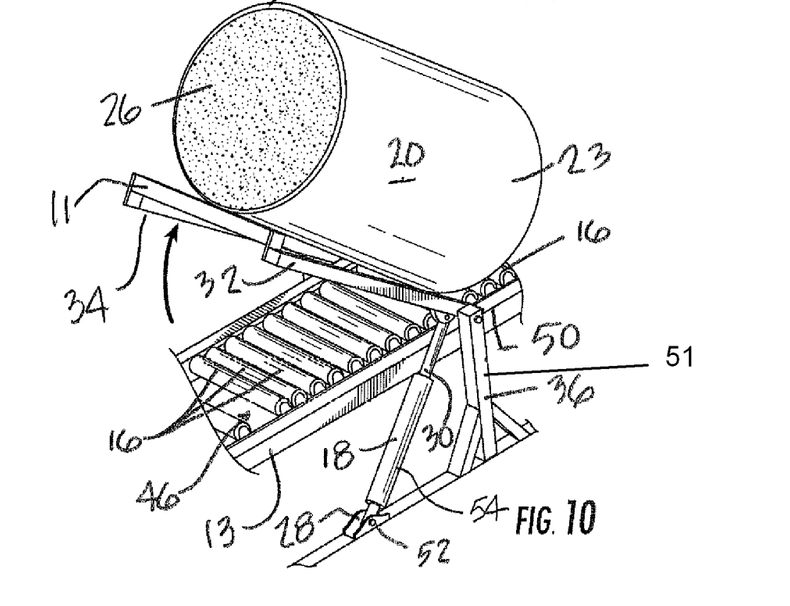
FIG. 10 is a fragmentary perspective view of a preferred embodiment of the apparatus of the present invention showing rotation of the actuating arm.
Figure 11:
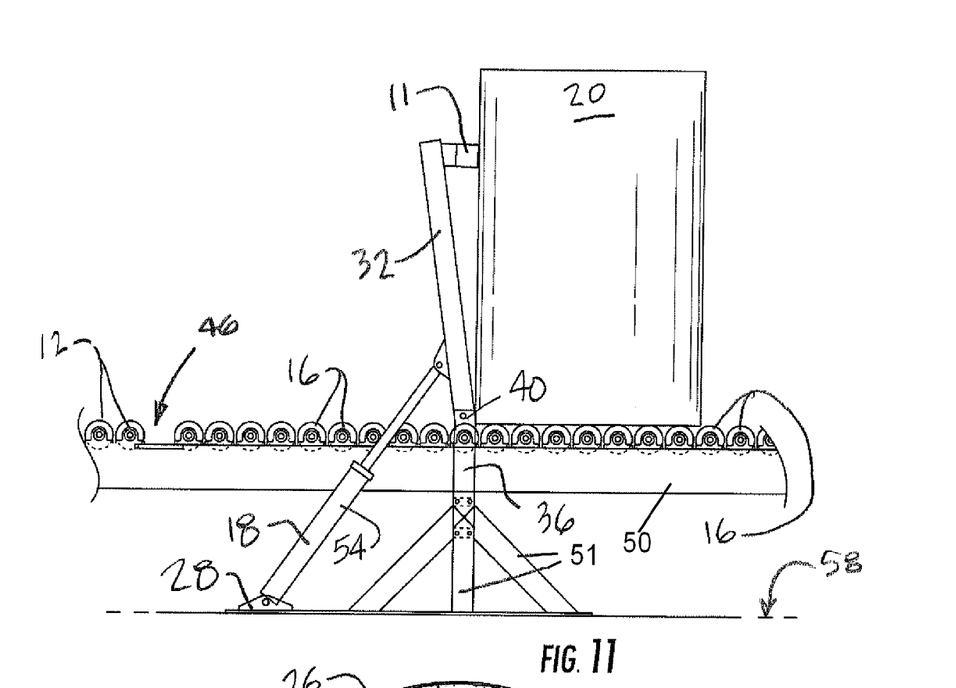
FIG. 11 is a side fragmentary elevation view of a preferred embodiment of the apparatus of the present invention illustrating the cotton module after it has been rotated from a first prone or horizontal position to a second upright or vertical position.
Figure 12:
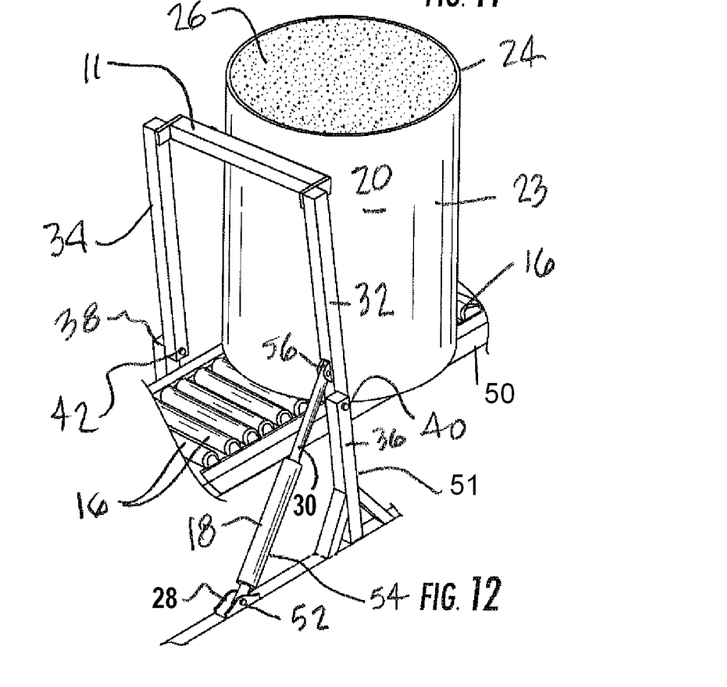
FIG. 12 is a partial perspective view of a preferred embodiment of the apparatus of the present invention.
Figure 13:
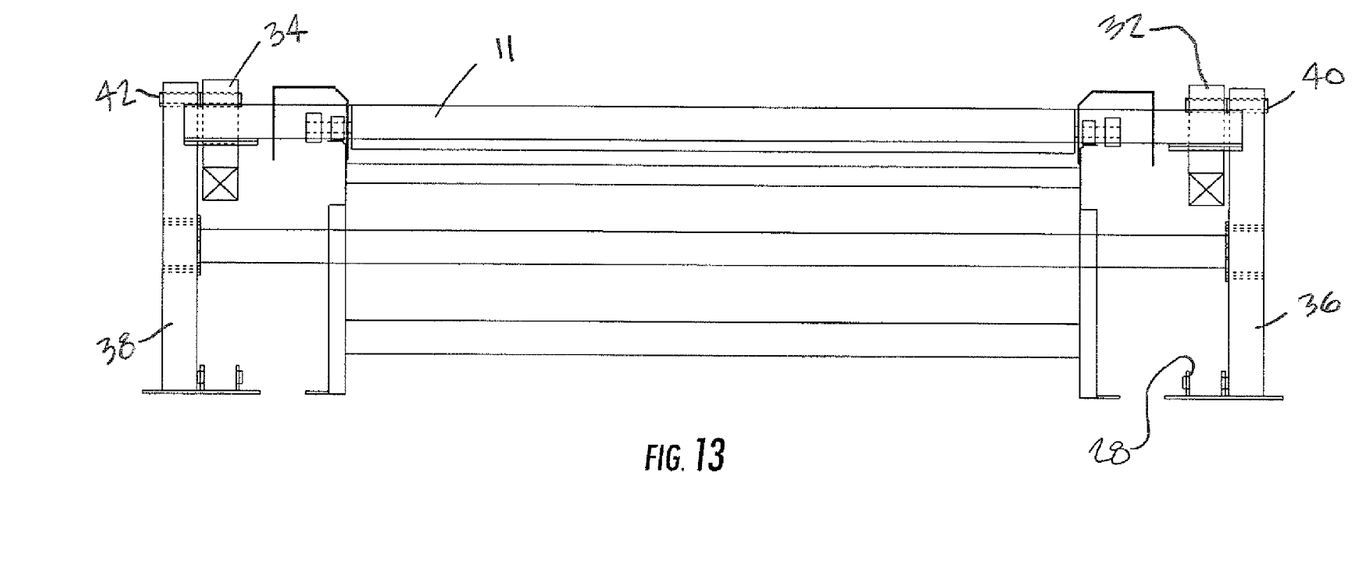
FIG. 13 is a fragmentary sectional view of a preferred embodiment of the apparatus of the present invention.
Figure 14:
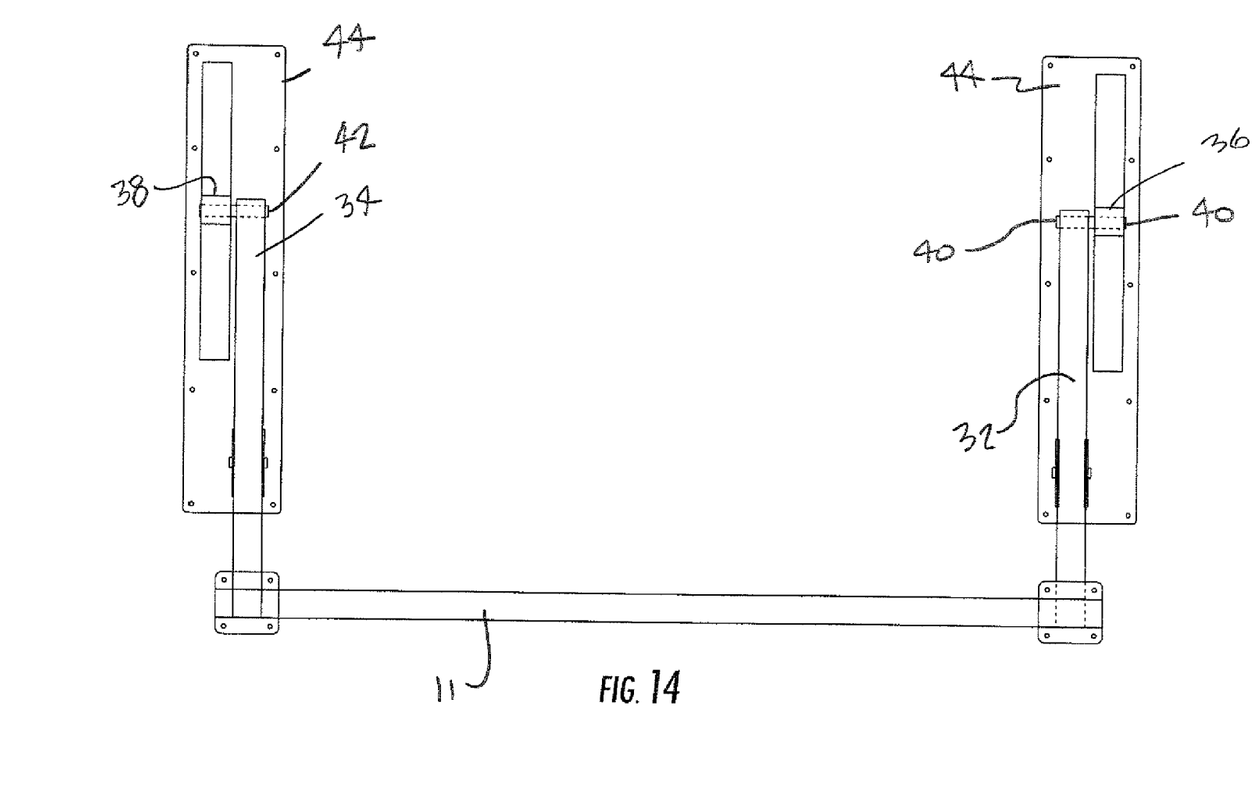
FIG. 14 is a fragmentary top view of a preferred embodiment of the apparatus of the present invention.

This transition or intermediate position 60 can also be seen by viewing FIGS. 5 and 6 for the initial reclined position of the module 20, and FIGS. 9 and 10 which show the transitional or intermediate position 60 and finally to FIGS. 11 and 12 that show the module 20 in the final elevated or upright or flipped position that is required for removal of its wrapper or wrapping 24.

The flipper apparatus of the present invention can be made of for example 5" square steel tube and can have, for example, dimensions of for example 168" in width, 45¾" in height, with a distance of pivot 40 to bar 11 of about 70", and with a distance from pivot 52 to pivot 56 (see e.g. FIG. 9) of about 40" when the cylinder 18 is retracted and about 72" when the cylinder 18 is extended, with a bar 11 length of about 156", when used with a roller conveyor having a width of 120" with rollers about 6⅝" in diameter. Not shown in the drawings is the hydraulic or pneumatic system which actuates the cylinders 18. This system can be any commercially available hydraulic or pneumatic system, such as a hydraulic power unit utilizing a 10 hp electric motor to pump hydraulic fluid, available from Franklin Electrofluid Co., Inc. of Memphis, Tenn. Preferably, the controls for the hydraulic or pneumatic system are adjacent catwalk or operator platform 61 and stepped side boards (retaining wall) 62, both shown in dotted lines in FIG. 1, to allow manual activation of flipper 14 by a worker. Catwalk 61 allows workers to access modules 20 adjacent flipper 14 so they can optionally partially remove wrapping 24 before modules 20 are flipped, and completely remove wrapping 24 after modules after they are enclosed between retaining walls 62 (though only one retaining wall 62 and one catwalk 61 are shown in FIG. 1, preferably on the other side of conveyors 13 are a like catwalk and retaining wall), so that when the wrapping 24 is removed and the bales 20 collapse, they do so where the cotton in bales 20 will be retained by retaining walls 62 and travel to cotton feeder head 15.

Stairs (not shown) are adjacent cotton feeder head 15 to allow workers access to the top of cotton feeder head 15. Disperser rollers 63 in the feeder head help to break up the cotton in the modules after the wrapping 24 has been removed.

Optionally, the actuating system is automatically activated responsive to the positioning of a cotton module 20 above the bar 11 (this can be accomplished by, for example, providing an optical electronic switch or mechanical limit switch or any other detector to detect the presence of a module 20 in position to be flipped).

Preferably, the conveyor stops automatically by means of for example a proximity switch normally in contact with bar 11 when bar 11 is in the resting position. This allows one module 20 to be flipped properly and the bar 11 to return to the resting position before another module 20 passes over gap 46. This proximity switch could, for example, be located below gap 46.

Also, one could include an automatic cutting device to cut the wrapper 24 as the module 20 passes the cutting device or when module 20 arrives at the cutting device.

In a preferred embodiment of the cotton module conveying and flipping apparatus 10, the cotton module 20 is elevated above the rollers 12, 16 as shown, for example, in FIGS. 9 and 10, with only bar 11 in contact with the upper end portion of module 20.

The conveyors, whether chain or roller type, are usually split into sections that are driven independently. Because it is important to have a constant feed of cotton to the feeder head, it might be beneficial to further split these sections at some points before or after the flipper in order to run a conveyor section or conveyor sections at a higher speed to close any gaps that may occur between the round modules when there is a time lag between arrivals of cotton bales (so new cotton bales can speed up to catch up with cotton bales already near the feeder head).

PARTS LIST

The following is a list of suitable parts and materials for the various elements of the preferred embodiment of the present invention.

| Part Number | Description |
| --- | --- |
| 10 | cotton module handling apparatus |
| 11 | bar |
| 12 | roller |
| 13 | conveyor system/feeder-conveyer |
| 14 | lifting mechanism |
| 15 | cotton module feeder disperser head |
| 16 | roller |
| 18 | extensible cylinder/hydraulic cylinder |
| 20 | cotton module |
| 21 | end |
| 22 | end |
| 23 | outer side wall |
| 24 | wrapper/wrapping |
| 26 | cotton |
| 28 | foot |
| 30 | pushrod |
| 32 | arm |
| 34 | arm |
| 36 | column/post |
| 38 | column/post |
| 40 | pivot/pivotal attachment |
| 42 | pivot/pivotal attachment |
| 44 | base/anchor plate |
| 46 | gap |
| 48 | arrow |
| 50 | frame |
| 51 | frame |
| 52 | pivot/pivotal connection |
| 54 | cylinder |
| 56 | pivot/pivotal attachment |
| 58 | floor/slab |
| 60 | transition positioner |
| 61 | operator platform |
| 62 | stepped side boards |
| 63 | disperser rollers |

All measurements disclosed herein are at standard temperature and pressure, at sea level on Earth, unless indicated otherwise.

The foregoing embodiments are presented by way of example only; the scope of the present invention is to be limited only by the following claims.

The invention claimed is:

1. A cotton module flipping apparatus comprising:
   a) a conveyor having an upper surface defined by a plurality of rollers, each with opposed roller ends, the conveyor having first and second end portions;
   b) a bar which is positioned to contact a cotton module as the module is conveyed on the conveyor system from said first end portion to said second end portion, the bar being placed in between a pair of the rollers;
   c) two arms attached to the bar at positions spaced laterally away from the rollers, wherein the bar is supported by the two arms which are positioned at opposing end portions of the rollers;
   d) an actuating system attached to the two arms to cause the two arms to lift the bar to an elevated position when the cotton module on the conveyor system is positioned above the bar, enabling the bar to engage and tilt the cotton module from a horizontal to a vertical position; and
   e) wherein said two arms travel along an arcuate path of about 90 degrees next to but laterally removed from the rollers.

2. The apparatus of claim 1, wherein the actuating system includes hydraulics.

3. A cotton module flipping apparatus, comprising:
   a) a conveyor having a plurality of rollers that define a conveying surface area for supporting a cotton module thereon, each roller having roller ends;
   b) a gap in between two of said rollers;
   c) a bar which is next to the conveying surface area and in said gap when the bar assumes a first lower position;
   d) two arms attached to the bar and spaced laterally away from the rollers, wherein the bar is supported by the two arms which are positioned at opposing end portions of the rollers;
   e) an actuating system attached to the two arms to cause the two arms to rotate through an arcuate path of about 90 degrees to lift the bar from the lower position to a second elevated position when a cotton module on the conveyor system is positioned to be tilted from a horizontal to a vertical position; and
   f) wherein the bar vacates a gap in between two said rollers when the bar moves to the elevated position.

4. The apparatus of claim 3, wherein the actuating system includes hydraulics.

5. A method of preparing a cotton module for use in a cotton gin, comprising:
   providing the apparatus of claim 1;
   using the apparatus to flip a cotton module into a vertical position when the bar moves from the lowered position to the upper position;
   removing wrap from the cotton module after the module has been flipped.

6. A cotton module conveying and flipping apparatus, comprising:
   a) a conveyor that includes a plurality of rollers defining a conveying surface that is able to support a cotton module to be conveyed;
   b) a gap in between two said rollers;
   c) a bar that is positioned to contact the cotton module as the module is conveyed on said conveyor, the bar being movable from a lower position wherein the bar occupies said gap to an elevated position wherein the bar vacates said gap;
   d) the bar being supported by a frame that includes two arms that are spaced laterally from the rollers; and
   e) an actuating system attached to the arm or arms that rotates the arm through an arcuate path of about 90 degrees and lifts the bar when a cotton module on the conveyor system reaches a position next to the bar, the bar being movable between a lower position wherein the bar occupies said gap and a raised position wherein the bar vacates the said gap;
   f) wherein the actuating system elevates the bar to place it in said raised position to elevate the cotton module there-with, and wherein the bar is supported by the two arms which are positioned at opposing end portions of the rollers.

7. The cotton module conveying and flipping apparatus of claim 6, wherein the actuating system includes a hydraulic cylinder that extends to elevate the bar.

8. The cotton module conveying and flipping apparatus of claim 6, wherein the frame extends below the rollers.

9. The cotton module conveying and flipping apparatus of claim 6, wherein each roller has a width and the bar has a width that is about the same width of a said roller located next to the bar.

10. The cotton module conveying and flipping apparatus of claim 9, wherein the bar is longer than each of the rollers next to the bar.

11. The cotton module conveying and flipping apparatus of claim 6, wherein the actuating system is manually activated.

12. The cotton module conveying and flipping apparatus of claim 6, wherein the actuating system is automatically activated responsive to the positioning of a cotton module above the bar.

13. The cotton module conveying and flipping apparatus of claim 6, wherein the cotton module is rotated a measure of about 90 degrees.

14. The cotton module conveying and flipping apparatus of claim 6, wherein the cotton module is elevated above the rollers.

15. A cotton module flipping apparatus comprising:
  a) a conveyer system having a plurality of parallel rollers;
  b) a bar which fits in a gap between two of the rollers;
  c) two arms attached to the bar, each arm spaced laterally away from the rollers, wherein the bar is supported by the two arms which are positioned at opposing end portions of rollers;
  d) an actuating system attached to the two arms to cause the two arms to rotate the two arms through an arcuate path of about 90 degrees and lift the bar when a cotton module on the conveyor system is positioned to be tilted from a horizontal to a vertical position.

16. The apparatus of claim 15, wherein the actuating system includes hydraulics.

17. A method of preparing a cotton module for use in a cotton gin, comprising the steps of:
  a) conveying the cotton module along a conveyor that has multiple rollers;
  b) placing a lifting bar in a gap that is between two of said rollers to define a bar lowered position, wherein the bar is supported by two arms positioned at opposing end portions of the rollers and laterally spaced away from the rollers;
  c) moving the bar through an arcuate path of about 90 degrees when the cotton module is positioned above the lifting bar to define a bar elevated position, and using the lifting bar to flip the cotton module so that the cotton module is partially elevated and rotated; and
  d) removing wrap from the cotton module after the module has been flipped.

18. A cotton module conveying and flipping apparatus, comprising:
  a) a conveyor having a conveyor surface area that is configured to convey a cotton module from a first location to a second location;
  b) a bar which can contact a cotton module as the module is conveyed on said conveyor, said bar being positioned at said second location;
  c) the bar being supported by a frame that includes two arms spaced laterally away from said conveyor;
  d) an actuating system attached to the two arms that moves the two arms through an arcuate path of about 90 degrees and lifts the bar when a cotton module on the conveyor system reaches said second location, the bar being movable between lower and raised positions wherein the lower position the bar is at or below said conveyor surface; and
  e) wherein the actuating system elevates the bar from the lower position to place it in said raised position when the cotton module reaches the second location, wherein the bar is supported by two arms positioned at opposing end portions of rollers.

19. The cotton module conveying and flipping apparatus of claim 18, wherein the actuating system includes a hydraulic cylinder that extends to elevate the bar.

20. The cotton module conveying and flipping apparatus of claim 18, wherein the frame extends below the conveyor surface area.

21. The cotton module conveying and flipping apparatus of claim 18, wherein the conveyor surface area has a width and the bar has a length that is about the same as the width of a said conveyor surface area located next to the bar.

22. The cotton module conveying and flipping apparatus of claim 18, wherein the bar is longer than each of the width of the conveyor surface area next to the bar.

23. The cotton module conveying and flipping apparatus of claim 18, wherein the actuating system is manually activated.

24. The cotton module conveying and flipping apparatus of claim 18, wherein the actuating system is automatically activated responsive to the positioning of a cotton module above the bar.

25. The cotton module conveying and flipping apparatus of claim 18, wherein the cotton module is rotated a measure of about 90 degrees.

26. The cotton module conveying and flipping apparatus of claim 18, wherein the cotton module is elevated above rollers.

27. A cotton module flipping apparatus comprising:
  a) a conveyor having a plurality of rollers;
  b) a bar which occupies a position in a gap that is in between two of the rollers;
  c) two arms attached to the bar, the arms spaced laterally away from the rollers, wherein the bar is supported by the two arms which are positioned at opposing end portions of the rollers;
  d) a lifting system attached to the arms that enables the arms to lift the bar;
  e) an actuator that operates the lifting system when a cotton module on the conveyor system is positioned above the bar, the bar movable along an arcuate path of about 90 degrees between a reclined position wherein the bar occupies said gap and an elevated position wherein the bar vacates the said gap and the cotton module is tilted from a horizontal to a vertical position when the bar moves to the elevated position.

28. The apparatus of claim 27 wherein the actuator includes a hydraulic ram.

29. A method of preparing a cotton module for use in a cotton gin, comprising the steps of:
  a) conveying the cotton module along a conveyor that has multiple rollers;
  b) placing a lifting bar in a gap that is in between two of said rollers in a lower position, wherein the bar is supported by two arms which are positioned at opposing end portions of the rollers, and spaced laterally away from the rollers;
  c) lifting the bar along an arcuate path of about 90 degrees to an elevated position when the cotton module is positioned above the lifting bar, using the lifting bar to flip the cotton module so that it is partially elevated and rotated; and d) removing wrap from the cotton module after the module has been flipped.

\* \* \* \* \*